United States Patent [19]

Miller et al.

[11] Patent Number: 5,956,644
[45] Date of Patent: Sep. 21, 1999

[54] MULTIPLE-USER COMMUNICATION UNIT AND METHOD FOR OPERATING IN A SATELLITE COMMUNICATION SYSTEM

[75] Inventors: Nathan West Miller, Tempe; Peter J. Armbruster, Chandler; Daniel Richard Tayloe, Phoenix, all of Ariz.

[73] Assignee: Motorola, Inc., Schaumburg, Ill.

[21] Appl. No.: 08/901,121

[22] Filed: Jul. 28, 1997

[51] Int. Cl.[6] ............................................. H04Q 7/38
[52] U.S. Cl. .................. 455/453; 455/431; 455/561; 455/436; 455/12.1; 455/435
[58] Field of Search ................................. 455/453, 431, 455/427, 428, 561, 12.1, 13.1, 435–436

[56] References Cited

U.S. PATENT DOCUMENTS

| | | | |
|---|---|---|---|
| 5,212,804 | 5/1993 | Choate | 455/431 |
| 5,513,255 | 4/1996 | Yoo et al. | 379/133 |
| 5,519,761 | 5/1996 | Gilhousen | 455/431 |
| 5,590,395 | 12/1996 | Diekelman | 455/13.1 |
| 5,651,050 | 7/1997 | Bhagat et al. | 455/431 |
| 5,713,075 | 1/1998 | Threadgill et al. | 455/427 |
| 5,740,535 | 4/1998 | Rune | 455/437 |
| 5,754,959 | 5/1998 | Ueno et al. | 455/453 |
| 5,790,954 | 8/1998 | Tayloe et al. | 455/437 |
| 5,838,770 | 11/1998 | Fukushima et al. | 379/34 |

*Primary Examiner*—Nguyen Vo
*Assistant Examiner*—Duc Nguyen
*Attorney, Agent, or Firm*—Gregory J. Gorrie; James E. Klekotka

[57] ABSTRACT

A multiple-user subscriber unit (MCU) (110) is used by subscribers (240) in a group of subscribers to obtain communications services from the communication system. MCU (110) is co-located with a mobile vehicle and a group of subscribers. The MCU (110) and procedure (300) enable the MCU to reduce impulsive loading of the communication system caused by simultaneously requests for service. MCU (110) determines a set of tasks which includes a number of call-processing tasks, a number of hand-off tasks, and a number of re-registration tasks. Priorities are established for the tasks which must be performed. A schedule is established based on the priorities and the amount of time required to perform the tasks and the total amount of time available to perform the tasks. Tasks are performed according to the schedule and this reduces impulsive loading of the communication system (100).

20 Claims, 3 Drawing Sheets

MULTIPLE-USER COMMUNICATION UNIT AND METHOD FOR OPERATING IN A SATELLITE COMMUNICATION SYSTEM

FIELD OF THE INVENTION

The present invention relates generally to satellite communication systems. More specifically, the present invention relates to using multiple-user devices in a satellite communication system that supports multiple-user devices.

BACKGROUND OF THE INVENTION

Subscribers use various devices (e.g., a cellular telephone or pager) to communicate with other subscribers within a satellite communication system. These devices communicate with the system via several communications processes, each involving an exchange of messages between the subscriber and the system.

Registration, for example, is one of these communication processes. Each registration process involves an exchange of registration messages between the subscriber and the system. Registration may also be used to keep track of the subscriber so that the system knows where to send messages that indicate an incoming call for that subscriber.

Call setup is another example of these communication processes. Each call setup process involves an exchange of a set of call setup messages between the subscriber and the system. These messages may also contain registration messages.

Hand-off is a process that occurs during the course of either a call or a registration process. The hand-off process is used to transfer the call from the coverage of one cell or beam to another.

In some existing satellite systems, provision has been made to allow isolated local networks supporting more than one fixed telephone set to access such satellite communication systems. Typically, a multiple-user communication unit (MCU) is used to couple a local network to a satellite communication system. A mobile exchange unit (MCU) provides, among other things, an interface between a local network and a satellite communication system. Typically, the MCU supports multiple channels to the satellite communication system, and the MCU allows individual users of the local network access to the satellite communication system by allowing the multiple channels to be shared by the subscribers associated with the local network.

Procedures for allowing multiple-user communication devices to access the communication system should efficiently use system resources. In some cases, these local networks are generally large enough that it is either economically or physically impossible to allocate a radio access resource to each fixed telephone set. In other cases, these isolated local networks are on mobile vehicles where individual communication units are not easily supported.

The impact on a communication system of multiple subscribers using multiple-user communication devices is particularly trouble-some when groups of subscribers, which are using a particular MCU, request service at the same time or within a short period of time. This can occur on a mobile vehicle (e.g., communication units on-board an airplane). In this case, all of the system subscribers might request registration when they board the airplane and the MCU has to individually register each subscriber with the system.

As a part of typical cellular call processing procedures, each subscriber registers, hand-offs, and setups a call individually with the system. The impact of high load transients upon the system results in a large amount of work which has to be performed by the system in a relatively short amount of time. However, since systems are typically constrained to the number of processes it can perform in a given time period, such an impulsive load of processes can detrimentally affect the system. This may cause other system subscribers that are also requesting service to be queued behind a large processing load, leading to an increased number of dropped calls and dissatisfied system subscribers.

Thus, what is needed are a method and apparatus for reducing impulsive loading of a communication system. What is also needed are a method and apparatus for reducing impulsive loading by groups of subscribers who are using a multiple-user communication unit. Further needed is a method and apparatus to reduce the amount of work which a communication system has to perform to provide services to groups of subscribers.

DETAILED DESCRIPTION OF A PREFERRED EMBODIMENT

The method and apparatus of the present invention, among other things, reduce impulsive loading of a communication system by groups of subscribers who are using a multiple-user communication unit. Further, the method and apparatus of the present invention reduce the amount of work which a communication system has to perform to provide services to groups of subscribers.

As used herein, the terms "cell" and "beam" are not intended to be limited to any particular mode of generation and include those created by either terrestrial or satellite cellular communications systems and/or combinations thereof. The present invention is applicable to terrestrial-based and space-based communication systems. Systems may include satellites having low-earth, medium-earth and geo-synchronous orbits.

Figure 1:
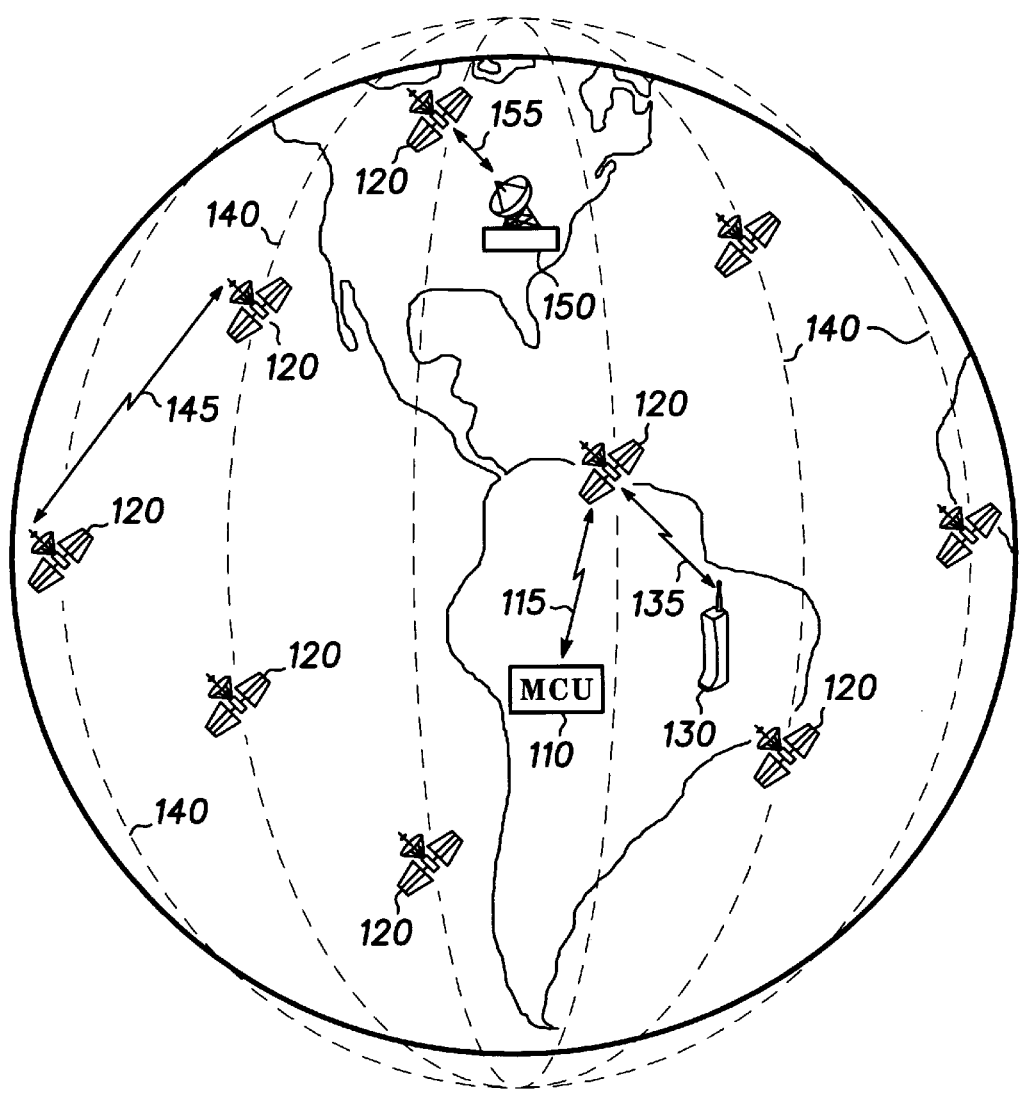
FIG. 1 illustrates a highly simplified diagram of a satellite-based communication system in which a preferred embodiment of the present invention may be practiced.

FIG. 1 illustrates a highly simplified diagram of a satellite-based communication system in which a preferred embodiment of the present invention may be practiced. Communication system 100 comprises multiple-user communication units (MCUs) 110, communication satellites 120, single-user communication units (CUs) 130, and terrestrial stations 150.

Communication satellites 120 are illustrated using six polar orbits 140, with each orbit 140 holding eleven satellites 120 for a total of sixty-six satellites 120. However, this is not essential and more or fewer satellites, or more or fewer orbits, can be used. While the present invention is advantageously employed when a large number of satellites are being used, it is also applicable with as few as a single satellite. For clarity, FIG. 1 illustrates only a few of satellites 120.

In a preferred embodiment, each orbit 140 encircles earth at an altitude of around 780 km, although higher or lower orbital altitudes can be usefully employed. For the example shown, satellites 120 travel with respect to earth at around 25,000 km/hr. This allows satellite 120 to be visible to an MCU 110, terrestrial station and/or CU 130 for a maximum period of approximately nine minutes. Because of the relative movement between communication satellites 120 and MCUs 110, communication link 115 is a temporary one and hand-off schemes are employed to realize a continuous communication channel.

Communication satellites 120 communicate with MCUs 110 which can include a number of radio communication transceivers using communication links 115. Communication satellites 120 communicate with terrestrial stations 150 using earth links 155. Communication satellites 120 communicate with communication units 130 using subscriber links 135. Terrestrial stations 150 can be system control centers or connected to one or more system control centers. Terrestrial stations 150 can also be gateways or connected to one or more gateways (GWs), which provide access to a public switched telephone network (PSTN) or other communications facilities. One MCU 110 and one terrestrial station 150 are shown in FIG. 1 for clarity and ease of understanding.

Communication units 130 can be located anywhere on the surface of the earth or in the atmosphere above the earth. Communication units 130 are preferably communications devices which transmit data to and receive data from communication satellites 120. By way of example, communication units 130 can be hand-held, portable cellular telephones adapted to communicate with communication satellites 120.

MCUs 110 can also be located anywhere on the surface of the earth or in the atmosphere above the earth. MCUs 110 are preferably located on vehicles of a type designed to transport groups of passengers. For example, MCUs 110 may be located on busses, ships, monorails, and airplanes, although this list is not exhaustive. Diverse terrestrial-based mobile and fixed local networks may access communication system 100 through MCUs 110.

MCUs 110 are preferably communications devices which transmit data to and receive data from communication satellites 120 on many different channels at the same time. Also, MCUs 110 perform call-processing tasks, hand-off tasks and registration tasks in conjunction with communication satellites 120.

Communication system 100 may accommodate a large number of MCUs 110. In a preferred embodiment of the present invention, MCUs 110 communicate using communication equipment (not shown) located on the MCU. The communication equipment is used to establish links 115 with nearby communication satellites 120.

Links 115 encompass a limited portion of the electromagnetic spectrum that is divided into numerous channels. Links 115 are preferably combinations of L-Band frequency channels and can encompass Frequency Division Multiplex Access (FDMA) and/or Time Division Multiple Access (TDMA) communications (infra) and/or Code Division Multiple Access (CDMA) or combination thereof.

Links 115 may include one or more broadcast channels. MCUs 110 synchronize to at least one broadcast channel and monitor a broadcast channel to detect data messages which are addressed to them. MCUs 110 can transmit messages to communication satellites 120 over one or more acquisition channels. Broadcast channels and acquisition channels are not dedicated to any one MCU but are shared by all MCUs 110 and CUs 130 currently within view of satellite 120.

Traffic channels are two-way channels that are assigned to particular MCUs 110 and CUs 130 by communication satellites 120 from time to time. In a preferred embodiment of the present invention, a digital format is used to communicate data over all channels, and traffic channels support real-time communications. At least one traffic channel is assigned for each call, and each traffic channel has sufficient bandwidth to support, at a minimum, a two-way voice conversation.

Each satellite 120 includes an array (not shown) of directional antennas. Each array projects numerous discrete antenna patterns on the earth's surface at numerous diverse angles away from its satellite 120. The pattern of cells which a single satellite 120 projects on the earth's surface is referred to as a footprint. Overlap exists between cells and footprints. The size of overlaps varies in response to the location of the satellites 120 and the size and location of the beams.

Overlap regions are used advantageously in hand-off procedures. The cell position data can be calculated by applying conventional trigonometric techniques to orbital and antenna geometry. In particular, the cells' positions can be determined from the orbits' positions, the satellites' speed, orbits' distances from the earth, and angles of displacement for various beams supported by the satellites' antennas away from the satellites' Nadir directions. The cell position data can desirably describe the location of the center of each cell on the surface of the earth. The cell size can desirably be described by a radius from the center. In a preferred embodiment, an overlap is declared when at two cells occupy the same area.

While satellites 120 exhibit rapid movement relative to the earth, this movement is highly predictable. Thus, MCUs and/or terrestrial stations, can accurately and precisely predict satellite movement. With respect to one another, satellites 120 remain relatively stationary, except for orbits in a polar regions. The distances between satellites 120 in adjacent orbits vary with the latitudes of the satellites 120.

In a preferred embodiment, signal strengths for two or more overlapping beams are determined. In addition, a region of acceptable signal strength is determined. This is the region within the overlap area over which the number of hand-off tasks can be spread. It is this acceptable signal strength overlap, along with an estimate of the duration required for a hand-off, and how long it will take to move through this region of acceptable signal strength that determines how much time is available to spread out the resulting hand-offs.

Communication satellites 120 communicate with other nearby communication satellites 120 through cross links 145. Thus, a message from MCU 110 located at any point on or near the surface of the earth can be routed through the constellation of communication satellites 120 to within range of substantially any other point on the surface of the earth. A message can be routed down to CU 130 on or near the surface of the earth from satellite 120 using subscriber link 135. Alternatively, a message can be routed down to or up from any of many terrestrial stations 150, of which FIG. 1 shows only one, through earth links 155. Terrestrial stations 150 are preferably distributed over the surface of the earth in accordance with geophysical and/or geo-political boundaries.

At least one terrestrial station is coupled to each one of the MCUs through the communication satellites. The terrestrial station is responsible for maintaining data records for the MCU. Such data records include call data records (CDR), location information, subscriber information and priority information. Subscriber information can include current members of the group assigned to the MCU (which subscribers are aboard which aircraft). Also, the status for the subscribers and the mobile equipment can be stored by one of the terrestrial stations. This information can include re-registration boundary information and geo-political boundary information. Terrestrial station 150 can also maintain satellite constellation information. For example, this satellite constellation information comprises satellite location with respect to time, along with beam location and size with respect to time.

Also, terrestrial stations 150 either perform call-processing functions in conjunction with communication satellites 120 or terrestrial stations 150 exclusively handle call-processing and allocation of call handling capacity within communication system 100. Diverse terrestrial-based communications networks, such as the PSTN, preferably access communication system 100 through terrestrial stations 150.

Figure 2:
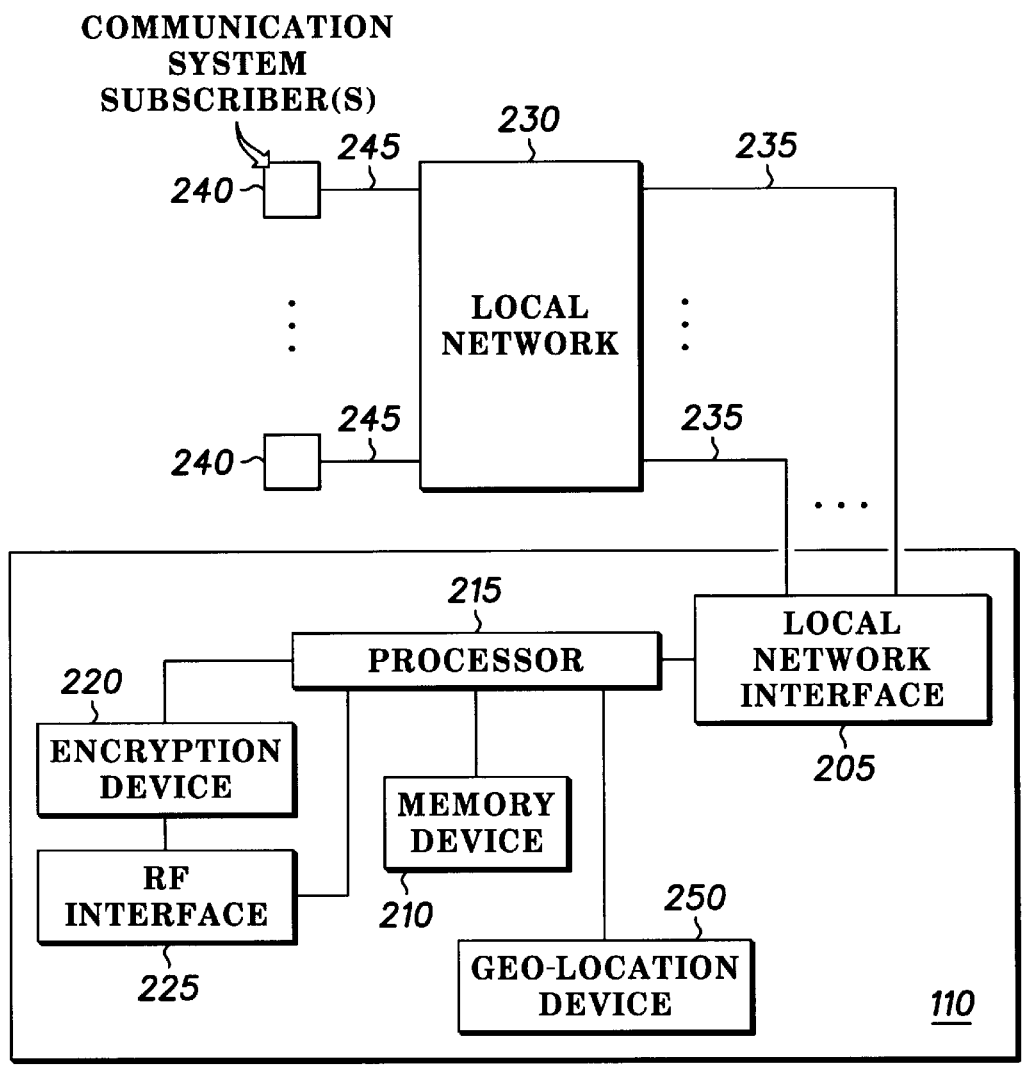
FIG. 2 shows a simplified block diagram of a multiple-user communication unit (MCU) and associated components in accordance with a preferred embodiment of the present invention.

FIG. 2 shows a simplified block diagram of a multiple-user communication unit (MCU) and associated components in accordance with a preferred embodiment of the present invention. MCU 110 is used along with local network 230 to provide communication capabilities for multiple subscribers 240. MCU 110, local network 230, and subscribers 240 are located in close proximity, such as on a mobile vehicle. In a preferred embodiment, MCU 110 includes processor 215, local network interface 205, RF interface 225, memory device 210, geo-location device 250, and encryption device 220. In alternate embodiments, MCU 110 need not include encryption device 220 and/or memory device 210 and/or geo-location device 250. Processor 215 manages all communication activity in real time.

In a preferred embodiment of the present invention, a relatively large number of subscribers can be under the control of processor 215. Typically, the normal response of such a processor would have been to determine the optimum time for a hand-off to the next beam and move everyone at once. However, since the system is constrained to the number of hand-offs it can process at a given time, such an impulsive load of hand-offs can detrimentally affect the system. This causes other subscribers in the system, that badly need to be handed-off, to be queued behind a possibly large number of hand-off tasks, and this leads to an increased number of dropped calls in the system.

The more traffic channels which are occupied on an MCU, which is moving with respect to the cell, the greater the transient of system resources which are consumed when the edge of the cell is reached and a hand-off becomes necessary. In a preferred embodiment, processor 215 predicts when the current beam (or cell) is coming to a boundary edge and provides additional information about which beam (cell) is to be the next hand-off candidate. Processor 215 also predicts the time at which the cell transition will occur, and how long it is expected to last. Processor 215 also determines when the hand-off process is going to be initiated so that the multiple hand-offs are performed over a longer period of time.

In a preferred embodiment, processor 215 determines the present location of a serving satellite (SV) and beam. Processor 215 also predicts the time for hand-off to a new beam on the same or a different SV using predicted motion of the SV and optionally of the MCU. Processor 215 also predicts a usable hand-off window from the current beam to the new beam using knowledge of the coverage of the system (e.g., beam footprints, SV position in orbit and position relative to the other SVs). Processor 215, when the hand-off window arrives, distributes the hand-offs over the window, taking into account how long a typical hand-off will require. Processor 215 does this to, among other things, reduce the impulsive loading impact on the system.

In addition, the more registered subscribers in the domain of an MCU which is moving with respect to the registration zone boundaries the greater the transient of system resources which are consumed when the MCU exceeds the re-registration distance. This registration distance is needed because the system needs to send messages to the subscriber alerting him to incoming calls. These alert messages will be sent within a region defined by a subscriber's last registration location and the system re-registration distance. When the subscriber moves far enough away from his last registered location, he needs to register again with the system in order to continue to be able to receive incoming calls.

In a preferred embodiment, processor 215 predicts when the current re-registration distance is going to be exceeded. Processor 215 uses the act of exceeding a fixed distance from the last registration point as a criterion for re-registration. Processor 215 also predicts a usable registration window preferably using knowledge of the system's allowable error tolerances in the re-registration distance. Processor 215, when a re-registration window arrives, distributes the registrations over the window, taking into account how long a typical registration takes place. Processor 215 distributes the re-registrations for the subscribers it controls to, among other things, reduce the impact on the system for all of the co-located subscribers registering at once.

In a preferred embodiment, processor 215 has access to location data for the MCU via a global positioning system (GPS) or some other method. Processor 215 determines heading and velocity in order to predict when the MCU will exceed the registration distance. Processor 215 uses this information to determine when to begin a time distributed re-registration process for all of the subscribers associated with the MCU.

For example, in a multi-passenger aircraft, registrations for the co-located subscribers are scheduled based on when they were initially registered with the system. Registrations are then scheduled, in this example, by the processor based on how far the MCU has traveled and how many subscribers are co-located on the MCU. This scheduling evenly distributes the registrations over a fixed time (for instance, the time it takes to travel 100 km). Processor 215 also does this to, among other things, reduce the impulsive loading on the system.

Local network interface 205 enables processor 215 to exchange data and messages with local network 230 over links 235. Subscribers 240 exchange data and messages with local network 230 over links 245. Links 235 and/or 245 can be hard-wired or RF communication links. Data and messages exchanged between processor 215 and subscribers 240 via local network 230 include, but are not limited to, subscriber registration information, registration status information, call setup information, and speech/data/fax information. The local network can comprise, for example, telephone handsets, faxes, computers, or data processing units which are coupled to the MCU using hard wired, optical, or RF links.

In a preferred embodiment, processor 215 processes information from those subscribers 240 who request to register and/or who request to use other subscriber services while communicating with the communication system via the MCU. Processor 215 determines location information for the MCU using geo-location device 250. In an alternate embodiment, processor performs location determining procedures using information from the communication system.

In a preferred embodiment, processor 215 also determines when the current re-registration distance is going to be exceeded. Processor 215 distributes over time the re-registrations for the subscribers it controls to, among other things, reduce the impact on the system.

In addition, processor 215 provides a means for handing-off multiple traffic channels at a single location, which is moving with respect to cell structure. Processor 215 accomplishes this using information about the system to predict when to begin hand-off. Processor 215 determines when to start the hand-off process so that all of the consumed traffic channels at a particular location are handed-off prior to the fading conditions that occur at the cell borders.

In a preferred embodiment, the messages from MCU 110 are encrypted by encryption device 220 prior to sending the messages to the communication system. In an alternate embodiment, messages are not encrypted and encryption device 220 is not necessary.

In a preferred embodiment, processor 215 also receives one or more response messages via RF interface 225 from the communication system. The response messages include information which indicates cell boundaries and registration boundaries.

Via local network interface 205, processor 215 can inform each of the subscribers 240 which want to use system services whether or not their request can be accomplished. Processor 215 can re-schedule some tasks for a later time based on the task's priority level. Processor 215 can also re-schedule tasks based on a success factor. For example, success factors can be used to prevent a single task from consuming too much time. This can occur if a task is allowed to run until it is successfully completed. Also, success factors can be used for tasks that require more than one step.

In a preferred embodiment, memory device 210 is used to store information which processor 215 requires in order to perform its necessary functions. Memory device 210 can be a random access memory, read only memory, or any other type of storage medium and can be integral with or separate from processor 215.

For example, memory device 210 includes status information for the RF interface which indicates problems with the communication link to the system satellites. In addition, memory device 210 may be used to store the cell boundary and registration boundary information for the MCU. Also, memory device 210 may be used to store the location, velocity and direction information for the MCU. Also, by way of example, memory device 210 may be used to store the number of subscribers located with the MCU, the number of hand-off tasks, the number of re-registration tasks, the number of call-processing tasks, the amount of time required to perform individual tasks, and the total amount of time to perform all of the tasks.

In a preferred embodiment, memory device 210 also includes the subscriber's registration information and preferences which are used for occasional future registration attempts. For example, when a subscriber using an MCU on a vehicle travels a pre-defined re-registration distance from the location where the subscriber last registered, the MCU can re-register the previously registered subscriber. This is done when the vehicle on which the MCU is located crosses a gateway boundary. Rather than prompting the subscribers for their registration information again, processor 215 extracts each subscriber's registration information from memory device 210. In an alternate embodiment, this feature is not provided and memory device 210 might not be required.

Local network interface 205 desirably supports the protocols necessary to transfer data to local network 230. Desirably, RF interface 225 is responsible for time and frequency accuracy, modulation and demodulation, frequency conversion, amplification, and the radiation and reception patterns.

In a preferred embodiment of the present invention, a number of system subscribers are using MCU 110 (FIG. 1) to communicate with a satellite or multiple satellites in a communication system. In a preferred embodiment, each MCU 110 is capable of supporting as many as 100 radio channels into communication system 100 (FIG. 1). However, those of skill in the art will understand that more or fewer radio channels can be also be supported. MCU 110 provides the radio channel access into communication system 100 (FIG. 1).

In alternate embodiments, MCU is used to provide a voice connection between a satellite communication system and public or private networks in areas that cannot support a full gateway. In this case, the MCU is considered to be relatively stationary. To perform this function, MCU 110 (FIG. 1) uses either a public or private network such as a Private Branch Exchange (PBX) to concentrate a large number of lines into a small number of shared lines to the MCU.

Figure 3:
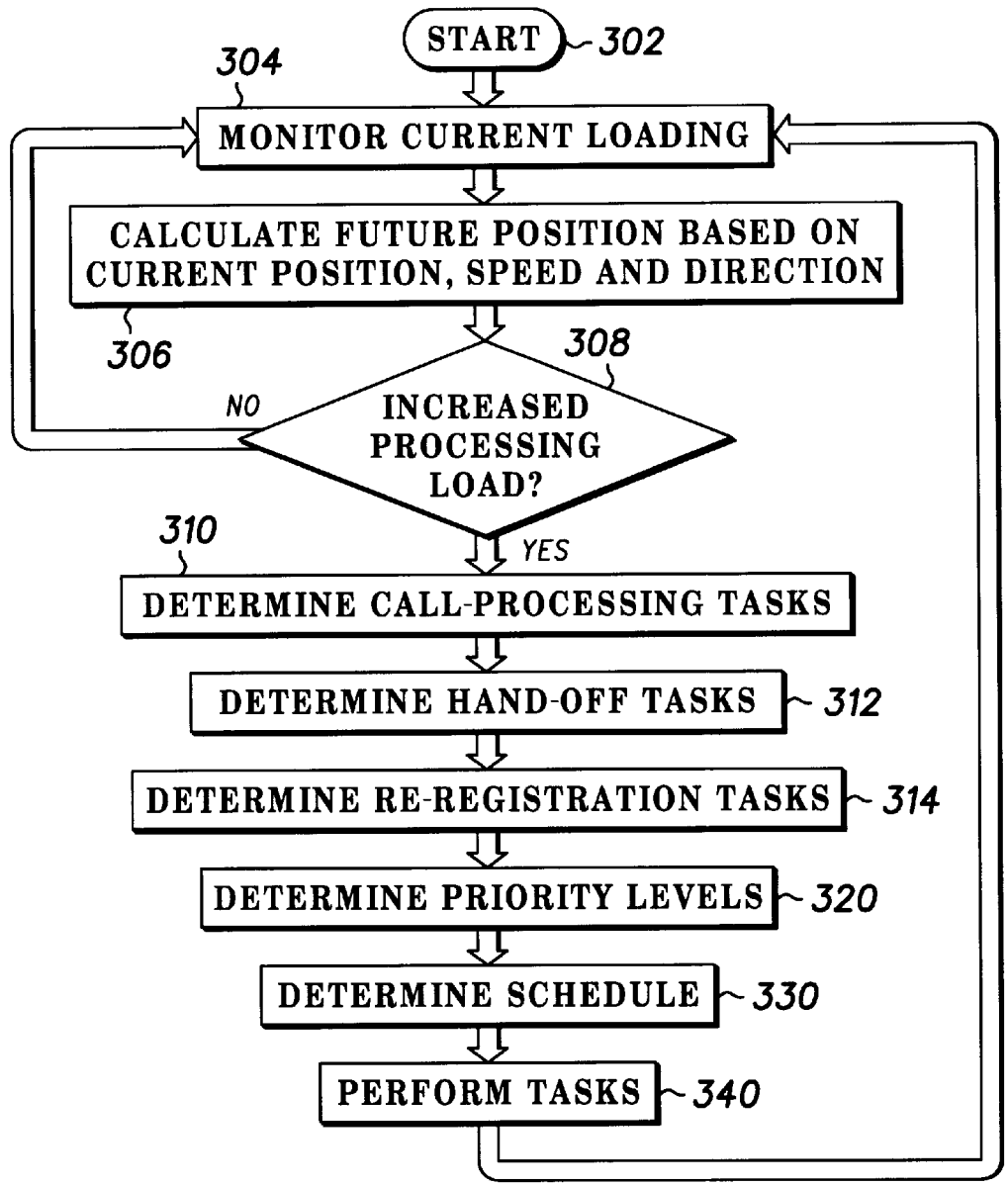
FIG. 3 illustrates a flowchart of a procedure performed by an MCU in accordance with a preferred embodiment of the present invention.

FIG. 3 illustrates a flowchart of a procedure performed by an MCU in accordance with a preferred embodiment of the present invention. In a preferred embodiment, procedure 300 is performed by an MCU located on the mobile vehicle. In other embodiments, the MCU is not located on a mobile vehicle. In addition, alternate embodiments are envisioned which have multiple MCUs at the same location.

In a preferred embodiment, at least one MCU, which is located with a mobile vehicle, provides the communication link with the communication satellites in the communication system. The group of subscribers use the MCU to obtain communications services from the communication system. In a preferred embodiment, a local network is also located with the vehicle and provides the interface between the subscribers and the MCU. Procedure 300 starts in step 302. For example, step 302 may be the result of a passenger or a group of passengers boarding an aircraft, or a system level command.

In step 304, information about the current loading for the MCU on the mobile vehicle is determined. The current loading is dependent on the number of communications service tasks which need to be performed by the MCU. In a preferred embodiment, the MCU monitors the current position, speed and direction information for the MCU. This information can be self-determined or obtained from the communication system. This information can include data about the number of broadcast channels being received and monitored, the number of acquisition channels being used, and the number of traffic channels being used by subscribers that have current calls in process. These subscribers typically are passengers in the mobile vehicle.

In step 306, the MCU computes a future position using the MCU's current position, speed, and direction. In a preferred embodiment, the future position is a fixed distance from the current position. In an exemplary system, the fixed distance is based on the cell size. The MCU knows its speed and direction and the distance to the future position. The MCU determines the amount of time that is required to travel the fixed distance. This is one of the time factors that the MCU uses to determine how to spread out the predicted processing load.

In an alternate embodiment, the MCU uses a look-ahead (future) time to determine the future position, and the look-ahead time is N time slots long. In this case, N is determined by the system. For this case, the look-ahead time is based on a current estimate for routing time through the constellation.

In step 308, the MCU predicts if the future position will result in an increased processing load. The processing load can comprise call-processing tasks, hand-off tasks, and re-registration tasks. First, the MCU determines if the future position will result in an increased number of call processing tasks. In other words, some members of the group need to have call-processing tasks performed by the MCU. Secondly, the MCU determines if the future position will result in an increased number of hand-off tasks. In this case, some members of the group need to have hand-off tasks performed by the MCU. Third, the MCU determines if the future position will result in an increased number of re-registration tasks. In other words, some members of the group need to have re-registration tasks performed by the MCU.

Those skilled in the art will recognize that the steps described above do not need to be performed in the sequence listed above. The sequence is not important to the nature of the present invention. Those skilled in the art will also recognize that some members of the group will require different tasks to be performed at different times.

When the future position does not result in an increased processing load, then procedure 300 branches to step 304 and iterates as shown in FIG. 3. When the future position does result in an increased processing load, then procedure 300 branches to step 310.

In step 310, the MCU determines the number of call-processing tasks that need to be performed. The MCU determines an expected computational time for each one of the call-processing tasks. Some call-processing tasks may have to be completed before the MCU actually reaches the future position.

In an alternate embodiment, the number of call-processing tasks is modified by a position factor. For example, known system loading factors for certain areas are used to alter the computations. In addition, weather conditions may be used to modify the number of call-processing tasks.

In a preferred embodiment, the MCU has access to system information which describes the communication system usage versus time. The communication system usage is known for certain areas, and geo-physical boundaries define areas with known levels of demand for the communications services. For example, historical usage data is used to forecast anticipated load increases when airplanes approach or leave airports. In addition, historical usage data may be used to forecast anticipated load changes when airplanes approach or leave land masses. Another example involves rate change boundaries. In this case, historical data is used to predict systems usage rates increase when billing rates decrease.

In step 312, the MCU determines the number of hand-off tasks that need to be performed. The MCU also determines an expected computational time for each one of the hand-off tasks. The MCU also determines a completion time for each hand-off task. Some hand-off tasks may have to be completed before the MCU actually reaches the future position.

In a preferred embodiment, the MCU has access to data which describes the location of the satellites in the communication system with respect to time (or topology of the satellite system). The MCU calculates its location in relation to the beam footprint of one or more serving satellites using the satellite location data. The MCU stores satellite system topological data which predicts the relative location of the satellites with respect to one another and with respect to the Earth at given points in time. The MCU uses its future position to predict its location within the satellite beam (cell) geometry and to predict the need to perform hand-off tasks. The topology of the network can provide a bias for choosing which beams to use as hand-off candidates.

In a preferred embodiment, the MCU predicts its location within the satellite beam to predict and prevent imminent fading. The MCU calculates how long it needs to hand-off the currently used channels. Additionally, the MCU calculates approximately how long it will remain in the current beam. In order to make a prediction, the MCU begins looking for hand-off candidates in time to allow for a distributed, sequential hand-off of the multiple traffic channels.

In step 314, the MCU determines the number of re-registration tasks that need to be performed. The MCU also determines an expected computational time for each one of the re-registration tasks. The MCU also determines a completion time for each task. Some re-registration tasks may have to be completed before the MCU actually reaches the future position.

In a preferred embodiment, the MCU has access to data which describes the location of the re-registration boundaries. In a preferred embodiment, service areas are used to define re-registration boundaries, and service areas are established using geo-physical and geo-political boundaries. This data can be stored in the MCU or obtained from the system when it is required. The more subscribers located with the MCU that require re-registration the greater the transient of system resources which are consumed when the MCU exceeds the re-registration distance. The MCU predicts when the current re-registration distance is going to be exceeded. The MCU uses its future position to predict when it will exceed the re-registration distance. After completing step 314, procedure 300 continues with step 320.

In step 320, priority levels are determined for the set of tasks included in the MCU's processing load. The processing load is the set of tasks which the MCU has to perform for the group. The set of tasks to be performed at a particular time is variable. Some members of the group may need to have call-processing tasks performed by the MCU. Some members of the group may need to have re-registration tasks performed by the MCU. Some members of the group may need to have hand-off tasks performed by the MCU. Others may need to have a combination of tasks performed.

Priority levels are established for the subscribers currently communicating with the system and for subscribers which are associated with the MCU but are not currently communicating with the system. In some cases, subscribers that are not currently communicating with the system may need to be re-registered with the system.

Priority levels are established based on system information and subscriber information. For example, priority levels can be established based on geo-political boundaries, rate change boundaries, and geo-physical boundaries. Also by way of example, some subscribers can be assigned lower priority levels because they choose not to pay for higher level of services. Additionally, some subscribers can be given a lower priority for re-registration if they are currently engaged in an on-going call. Typically, subscribers requiring hand-offs are given higher priority levels. In addition, a subscriber engaged in an emergency call is a given higher priority level. In this case, the call-processing tasks are the highest priority tasks because those tasks are required to perform an emergency call.

In an alternate embodiment, priority levels are changed for tasks associated with recently dropped calls. In other embodiments, re-registration tasks are given a higher priority. In this case, this is part of a premium service package offered which put these subscribers one step below an emergency call. For example, a business person that wants to be contacted as soon as possible no matter where he or she is located. This person would have to be re-registered as soon as possible every time he or she crossed a re-registration boundary. In another example, a subscriber who wanted to block out certain geo-political regions but wanted to be accessible (registered) as soon as possible after moving out of this politically sensitive region may be provided with a premium service.

In other embodiments, hand-off tasks are given a higher priority. In some cases, hand-off tasks are given a higher priority than re-registration tasks. Premium service packages also include a higher level of priority for hand-offs so that subscribers paying for a premium service would have their hand-off tasks perform first.

In step 330, a schedule is established for the set of tasks included in the MCU's work load. In a preferred embodiment, tasks with the highest priority are scheduled earliest. The set of tasks which the MCU has to perform for the group at a particular time is variable. Some members of the group may need to have call-processing tasks performed by the MCU. Some members of the group may need to have re-registration tasks performed by the MCU. Some members of the group may need to have hand-off tasks performed by the MCU. Others may need to have a combination of tasks performed.

The MCU distributes the tasks for the subscribers it controls over a given amount of time to, among other things, reduce the impact on the system. Typically, the amount of time allowed for the re-registration tasks is based on the speed and direction of the MCU with respect to the re-registration boundary. In a preferred embodiment, the re-registration distance error, along with the speed, and directional heading are also used to predict the time allowed for distributing the registration traffic. Typically, the amount of time allowed for the hand-off tasks is based on the speed and direction of the currently serving cell with respect to the MCU. Typically, the amount of time allowed for the increased call-processing load is based on the speed and direction of the currently serving cell with respect to the MCU and on the speed and direction of the MCU with respect to a geophysical boundary.

In scheduling tasks, the MCU evaluates the impact to the system. In a preferred embodiment, the MCU is a multi-processing unit. An MCU comprises several independent transceivers which each can support a channel. An MCU is capable of simultaneously supporting a number of channels between itself and the communication system. Included in this number of channels are broadcast channels, acquisition channels, and traffic channels. The MCU determines how many of these channels it can use without drastically affecting the system performance.

In a preferred embodiment, the MCU knows how many channels the system support in a given region at a given time. In a preferred embodiment, the system supplies this information to the MCU. In an alternate embodiment, the MCU stores a historical data file. This may be the case if the MCU took the same route at the same time.

In scheduling tasks, the MCU evaluates the impact to the group. In a preferred embodiment, the MCU considers interference. The number of channels that can be operated simultaneously is constrained by a self-interference problem or an outside interference problem.

In scheduling tasks, the MCU also evaluates the impact to individual that needs to have a particular task performed. In a preferred embodiment, the MCU also schedules tasks based upon how long a task takes. Because more shorter length tasks can be accomplished in a given amount of time, then more subscribers will presumably be happy. This occurs, for example, when a task can be accomplished using the same satellite as opposed to using two satellites. This would be the case for intra-satellite hand-off as opposed to inter-satellite hand-off. Intra-satellite hand-offs take less time so more of these are done faster. In an alternate embodiment, a hand-off between two satellites is more important and must be done first because doing this provides the best chance for preventing a dropped call.

In step 340, the set of tasks is performed according to the schedule. In a preferred embodiment, a task is performed once with a success factor being determined based on the outcome of the task. In a preferred embodiment, the success factor includes the number of failures. In this case, every time a task is performed unsuccessfully a counter in incremented.

In a preferred embodiment, a form of dynamic scheduling is used to perform the tasks. All tasks with the higher priority level are performed at least once before any lower level tasks are started. When a higher priority level task fails, then its success factor is changed. After performing all of the higher priority tasks once, the MCU determines if any of the higher priority tasks failed. In a preferred embodiment, tasks are performed twice before they are down-graded to the next priority level.

The lower level tasks are performed in a similar manner. The tasks with the higher priority level are performed at least once before any lower level tasks are started. When a higher priority level task fails, then its success factor is changed. After performing all of the higher priority tasks once, the MCU determines if any of the higher priority tasks failed. In a preferred embodiment, tasks are performed twice before they are down-graded to the next priority level. Also, a task is discarded when it fails three times.

In a preferred embodiment, a timer is used to control the amount of time used to perform the tasks. When the timer expires or the MCU has performed all of the tasks, then procedure 300 branches to step 304 and iterates as shown in FIG. 3.

In an alternate embodiment, priority level has a time dependent component. For example, while tasks are waiting to be completed their priority levels are increased based on an internal time clock. When a task is not performed before a specific time, then the priority level is increased. Also, the allowable time is segmented so that the priority of the task is increased as each segment of time passes. For example, if many new level one tasks were always coming into the queue, then old lower level tasks risk the chance of not being performed.

In a preferred embodiment, the amount of time used to distribute the hand-offs is based on signal strengths. For example, one implementation can define a minimum acceptable signal strength threshold. The MCU knows the beam's roll off patterns and the overlap between beams, and the MCU can use this knowledge to predict the distance over which hand-offs can be distributed. This distance along with the MCU's speed and direction is used to predict the time allowed to distribute the hand-offs.

The MCU can re-register each one of the subscribers individually or the MCU can perform a multiple subscriber registration. In the case of a multiple subscriber registration, the MCU collects the registration information, for example, by prompting each potential subscriber to enter his or her registration information. Each potential subscriber who wishes to register with the communication system can then enter their registration information. For example, the MCU can query potential subscribers based on a particular boundary crossing.

Registration information can be entered, for example, by entering digits into a keypad or by inserting a magnetically coded card or the user device can determine the necessity to register autonomously from the subscriber. In a preferred embodiment, the subscriber is identified by a subscriber Information Module (SIM). In an alternate embodiment, the MCU collects the registration information and sends a combined registration message to the system.

The MCU can hand-off each one of the subscribers individually or the MCU can perform a multiple hand-off in which case the MCU attempts to hand-off two or more subscribers simultaneously.

Location information is required for the MCU since all of the passengers on board the vehicle with the MCU are geo-located to this resolution. Geo-location information is necessary for the system to know where to contact the subscriber. Geo-location information is also necessary so that the MCU can determine current and future loading conditions. Geo-location information is also important for access denial. Subscriber agreements and preferences can be based on geo-physical and political boundaries. In addition, MCU operational agreements can be based on geo-physical and political boundaries. Also, local interference restrictions can also prevent an MCU from operating at a particular location at a particular time.

In a preferred embodiment, the messages from an MCU are encrypted. Although encryption is not necessary to the present invention, encryption is useful to protect the subscriber service information from acquisition by parties who may use the information for illegitimate purposes. For example, encryption protects the identification number for the MCU and the subscriber's location from being compromised. In alternate embodiments, encryption is not used.

Typically, the MCU sends the messages over an RF link between the MCU and the communication system. However, an MCU located on a vehicle which can communicate over hard-wired links (e.g., an MCU in a mobile vehicle riding on a rail) can send the messages over a hard-wired link such as through a rail. In alternate embodiments, terrestrial links or a combination of space-based and terrestrial links may be used.

The system receives and processes messages from the MCU. The system transmits response messages to the MCU. The MCU receives and processes the response messages from the communication system. A response message can indicate whether or not the MCU has been successfully identified. In some cases, the response message can indicate whether or not the MCU was successfully geo-located. The response message also indicates which subscriber or subscribers the communication system has successfully registered and/or which subscriber or subscribers the communication system has not successfully registered.

The MCU can inform each subscriber via the local network of his or her registration status (i.e., as either successful or unsuccessful). In alternate embodiments, the MCU either informs those subscribers who have not been successfully registered, or informs those subscribers who have been successfully registered. In another alternate embodiment, the MCU informs a subscriber of his or her registration status when the subscriber attempts to establish a communication link with a non-passenger.

The method and apparatus of the present invention provide a means for distributing the re-registration tasks of multiple subscribers at a single location which is moving with respect to the cell structure by using location information. This reduces the "transient impulse" of re-registration tasks which would occur when multiple subscribers exceed the re-registration distance simultaneously. The impulse is replaced with a controlled distribution of re-registration tasks. Because there is a limit to the system processing resources, having large numbers of simultaneous accesses for registration can create transient overloads in the system resources leading to service disruptions. Because registrations for co-located subscribers are distributed, the potential service disruptions are lessened.

The method and apparatus of the present invention also provide a means for handing-off multiple traffic channels at a single location, which is moving with respect to cell structure, by using information about the system to establish a schedule for hand-off tasks. This allows the hand-off tasks to be distributed over a given amount of time. This reduces the "transient impulse" of hand-off tasks which would occur when multiple subscribers reach a cell boundary simultaneously. The impulse is replaced with a controlled distribution of hand-off tasks. Because there is a limit to the system processing resources, having large numbers of simultaneous hand-offs can create transient overloads in the system resources leading to service disruptions. Because hand-offs for co-located subscribers are distributed, the potential service disruptions are lessened.

What is claimed is:

1. A method for reducing impulsive loading of a communication system by a group of subscribers, said group using a multiple-user communication unit (MCU) for obtaining communications services from said communication system, said method comprising the steps of:

creating a work load for said MCU, said work load includes a number of communications service tasks for said group of subscribers;

determining a first number of call-processing tasks for said group, wherein said first number of call-processing tasks is part of said number of said communications service tasks included in said work load, said first number of call-processing tasks being determined by comparing a future position for said MCU with at least one geo-physical boundary;

determining a second number of hand-off tasks for said group, wherein said second number of hand-off tasks is part of said number of said communications service tasks included in said work load, said second number of hand-off tasks being determined by comparing a future position for said MCU with at least one cell boundary;

determining a third number of re-registration tasks for said group, wherein said third number of re-registration tasks is part of said number of said communications service tasks included in said work load, said third number of re-registration tasks being determined by comparing a future position for said MCU with at least one other geo-physical boundary;

calculating a first length of time to perform said first number of call-processing tasks, a second length of time to perform said second number of hand-off tasks, and a third length of time to perform said third number of re-registration tasks;

establishing an amount of time based on said first length of time, said second length of time, and said third length of time;

establishing a schedule for spreading said work load over said amount of time; and performing said work load in accordance with said schedule, whereby said impulsive loading of said communication system is reduced.

2. The method as claimed in claim 1, wherein said creating step further comprises the step of:

determining said number of said communications service tasks using a second future time.

3. The method as claimed in claim 1, wherein said creating step further comprises the step of:

determining said number of said communications service tasks using a second future position for said MCU.

4. The method as claimed in claim 1, wherein said creating step further comprises the step of:

determining said first number of call-processing tasks for said group, wherein said first number of call-processing tasks comprise communications service tasks obtained from a satellite communication system.

5. The method as claimed in claim 4, wherein said at least one geo-physical boundary defines an area with a known level of demand for said communications services obtained from said satellite communication system.

6. The method as claimed in claim 1, wherein said creating step further comprises the step of:

determining said second number of hand-off tasks for said group, wherein said second number of hand-off tasks comprise communications service tasks obtained from a satellite communication system.

7. The method as claimed in claim 1, wherein said at least one cell boundary defines an area which is established by a cell size and cell location in said communication system, wherein said cell size and said cell location are time dependent.

8. The method as claimed in claim 1, wherein said creating step further comprises the step of:

determining said third number of re-registration tasks for said group, wherein said third number of re-registration tasks comprise communications service tasks obtained from a satellite communication system.

9. The method as claimed in claim 1, wherein said at least one geo-physical boundary defines a service area with a known set of said communications services.

10. The method as claimed in claim 1, said method further comprises the step of:

scheduling said number of said communications service tasks in said work load.

11. The method as claimed in claim 1, said method further comprises the step of:

scheduling those tasks in said number of said communications service tasks in said work load which can be processed in said amount of time.

12. The method as claimed in claim 1, wherein said performing step further comprises the steps of:

performing said number of said communications service tasks in said work load as determined in said schedule.

13. The method as claimed in claim 1, wherein said performing step further comprises the steps of:

performing said number of said communications service tasks in said work load;

determining success factor for said number of said communications service tasks in said work load; and changing said schedule based on said success factor.

14. The method as claimed in claim 1, further comprising the steps of:

operating said MCU on a mobile vehicle.

15. A method for reducing impulsive loading of a communication system by a group of subscribers using a multiple-user communication unit (MCU) for obtaining communications services from said communication system, said group of subscribers and MCU associated with a mobile vehicle, said method comprising the steps of:

determining, by said MCU, a current work load for said MCU, wherein said current work load includes a number of communications service tasks which are to be performed by said MCU at a current position for said MCU and at a present time;

computing, by said MCU, a future position using a current position, a speed, and a direction for said mobile vehicle, wherein said future position is a fixed distance from said current position;

predicting, by said MCU, a future work load, wherein said future work load comprises a first number of call-processing tasks, a second number of hand-off tasks, and a third number of re-registration tasks which said MCU is expected to perform at said future position;

determining, by said MCU, said first number of call-processing tasks, said first number of call-processing tasks being determined by comparing said future position with a first set of areas defined by geo-physical boundaries, said first set of areas having expected levels of demand for communications services associated with them;

determining, by said MCU, said second number of hand-off tasks, said second number of hand-off tasks being determined by comparing said future position with a second set of areas defined by cell boundaries, said second set of areas having beam footprints associated with them;

determining, by said MCU, said third number of re-registration tasks said third number of re-registration tasks being determined by comparing said future position with a third set of areas defined by geo-physical boundaries, said third set of areas being associated with service areas;

establishing, by said MCU, priority levels for said first number of call-processing tasks, said second number of hand-off tasks, and said third number of re-registration tasks, wherein said priority levels are established based on system information and subscriber information;

establishing, by said MCU, a schedule for performing said first number of call-processing tasks, for performing said second number of hand-off tasks, and for performing said third number of re-registration tasks, wherein said schedule is established by distributing said future work load over an amount of time; and performing, by said MCU, said future work load according to said schedule.

16. A multiple-user communication unit (MCU) for providing services to a group of subscribers, said group using said MCU to obtain communications services from a communication system, said MCU comprising:

an RF interface for establishing at least one communication link with said communication system; and a processor coupled to said RF interface, said processor for creating a set of tasks for said MCU, for determining priority levels for said set of tasks, said priority levels being determined from system information and subscriber information, for establishing a schedule, said schedule for spreading said set of tasks over an amount of time to thereby reduce impulsive loading of said communication system, and for performing said set of tasks, wherein said processor further comprises means for determining a current work load for said MCU at a current position and at a present time; means for computing a future position using said current position, a speed, and a direction for said MCU; means for predicting a future work load comprising a first number of call-processing tasks, a second number of hand-off tasks, and a third number of re-registration tasks which said MCU is expected to perform at said future position; means for determining said first number of call-processing tasks by comparing said future position with a first set of areas defined by geo-physical boundaries, said first set of areas having expected levels of demand for communications services associated with them; means for determining said second number of hand-off tasks by comparing said future position with a second set of areas defined by cell boundaries; means for determining said third number of re-registration tasks by comparing said future position with a third set of areas defined by said geo-physical boundaries, said third set of areas being associated with service areas; means for establishing priority levels for said first number of call-processing tasks, said second number of hand-off tasks, and said third number of re-registration tasks; means for establishing said schedule for performing said first number of call-processing tasks, for performing said second number of hand-off tasks, and for performing said third number of re-registration tasks, wherein said schedule is established by distributing said future work load over an amount of time; and means for performing said future work load according to said schedule.

17. The MCU as claimed in claim 16, further comprising:

a local network interface coupled to said processor, said local network interface for interfacing between said processor and at least one local network.

18. The MCU as claimed in claim 16, further comprising:

an encryption device for encrypting data coupled between said processor and said RF interface, said encryption device for encrypting at least one request message prior to said RF interface transmitting said at least one request message.

19. The MCU as claimed in claim 16, further comprising:

a memory device coupled to said processor, said memory device for storing said set of tasks, for storing said priority levels, for storing said schedule, for storing said subscriber information, and for storing said system information.

20. The MCU as claimed in claim 16, further comprising:

a geo-location device coupled to said processor, said geo-location device for determining a current position, said current position being used to establish said schedule.

* * * * *